(12) United States Patent
Mouquet et al.

(10) Patent No.: US 10,567,212 B2
(45) Date of Patent: Feb. 18, 2020

(54) PROCESSING DATA FOR TRANSFERRING OR MIRRORING A MEDIA STREAM

(75) Inventors: Antoine Mouquet, Courbevoie (FR); Delphin Barankanira, Antony (FR)

(73) Assignee: ORANGE, Paris (FR)

(*) Notice: Subject to any disclaimer, the term of this patent is extended or adjusted under 35 U.S.C. 154(b) by 374 days.

(21) Appl. No.: 13/880,531

(22) PCT Filed: Oct. 21, 2011

(86) PCT No.: PCT/FR2011/052463
§ 371 (c)(1),
(2), (4) Date: Apr. 19, 2013

(87) PCT Pub. No.: WO2012/052693
PCT Pub. Date: Apr. 26, 2012

(65) Prior Publication Data
US 2013/0205036 A1    Aug. 8, 2013

(30) Foreign Application Priority Data
Oct. 22, 2010  (FR) .................................... 10 58655

(51) Int. Cl.
*H04L 29/06* (2006.01)
*H04L 29/08* (2006.01)

(52) U.S. Cl.
CPC .... *H04L 29/06469* (2013.01); *H04L 65/1006* (2013.01); *H04L 65/1066* (2013.01); *H04L 65/1083* (2013.01); *H04L 67/148* (2013.01)

(58) Field of Classification Search
CPC ........... H04L 65/1006; H04L 29/06353; H04L 65/1086; H04L 65/1089; H04L 29/06414;
(Continued)

(56) References Cited

U.S. PATENT DOCUMENTS 7,716,310 B2 * 5/2010 Foti ..................... H04L 65/1069
709/220
2003/0079020 A1 * 4/2003 Gourraud .......... H04L 29/06027
709/227
(Continued)

FOREIGN PATENT DOCUMENTS

| EP | 2 093 968 A1 | 8/2009 | |
| EP | 2093968 A1 * | 8/2009 | ......... H04L 65/1096 |
| EP | 2093968 A1 * | 8/2009 | ......... H04L 65/1096 |

*Primary Examiner* — Philip J Chea
*Assistant Examiner* — Ruth Solomon
(74) *Attorney, Agent, or Firm* — Drinker Biddle & Reath LLP

(57) ABSTRACT

A method of processing data for limiting, during a multimedia session involving a first user terminal, transferring or mirroring a media stream to other user terminals, including: a) receiving a request to transfer or mirror a media stream transmitted by the first user terminal, the request containing information relating to a second user terminal which is the target of the transfer or mirroring operation, and information relating to the media stream to be transferred or mirrored; b) comparing the information relating to the second user terminal and to the media stream to be transferred or mirrored with a series of information elements relating to transfer or mirroring operations authorized for the multimedia session, and determining, according to the comparison, an authorization for the transfer or mirroring operation; and c) when the transfer or mirroring operation is authorized, transferring or mirroring the media stream to the second user terminal.

9 Claims, 3 Drawing Sheets

(58) Field of Classification Search
CPC ............ H04L 65/1016; H04L 65/1069; H04L 65/105; H04L 67/14; H04L 67/02; H04L 67/306; H04L 29/06027; H04L 63/08; H04L 63/10; H04L 29/06469
USPC ....... 709/231, 228, 227, 224, 206, 222, 225, 709/204; 370/260, 352
See application file for complete search history.

(56) References Cited

U.S. PATENT DOCUMENTS

| | | | | |
|---|---|---|---|---|
| 2008/0084867 | A1* | 4/2008 | Foti | H04N 7/17336 370/352 |
| 2008/0117451 | A1 | 5/2008 | Wang | |
| 2009/0204673 | A1* | 8/2009 | Tian | H04L 12/1822 709/204 |
| 2009/0210536 | A1* | 8/2009 | Allen | H04M 3/58 709/227 |
| 2009/0271859 | A1* | 10/2009 | Trossen | H04L 29/06 726/12 |
| 2010/0064336 | A1* | 3/2010 | Jin | H04L 65/1016 725/110 |
| 2010/0070641 | A1* | 3/2010 | Allen | G06F 15/16 709/230 |
| 2010/0107205 | A1* | 4/2010 | Foti | H04L 65/1083 725/109 |
| 2010/0279670 | A1* | 11/2010 | Ghai | H04L 65/1083 455/414.3 |
| 2011/0110275 | A1* | 5/2011 | Shaheen | H04L 65/1086 370/260 |
| 2011/0161508 | A1* | 6/2011 | Kim | H04L 65/4015 709/228 |
| 2011/0191859 | A1* | 8/2011 | Naslund | G06F 21/10 726/27 |
| 2011/0295943 | A1* | 12/2011 | Peuziat | H04L 65/1069 709/203 |

* cited by examiner

PROCESSING DATA FOR TRANSFERRING OR MIRRORING A MEDIA STREAM

CROSS-REFERENCE TO RELATED APPLICATIONS

This application is the U.S. national phase of the International Patent Application No. PCT/FR2011/052463 filed Oct. 21, 2011, which claims the benefit of French Application No. 1058655 filed Oct. 22, 2010, the entire content of which is incorporated herein by reference.

BACKGROUND

The present invention relates to data processing for the communication of data over an information network.

In particular, the present invention relates to data processing for limiting, during a multimedia session involving a first user terminal, operations of transferring or replicating a media stream to other user terminals.

The expression information network must be understood in the broadest sense and the information network can in particular be a mobile telephone network, for example that called third generation (3GPP).

The development of telecommunications has allowed an increasing number of users to have available one or more media terminals, such as mobile telephones, computers or digital personal assistants, via which they can establish multimedia sessions.

In order to allow communication between information networks operating under different protocols, a standardized architecture called IMS (for Internet Protocol Multimedia Subsystem) has been developed. The IMS architecture is an open multimedia architecture which uses the SIP (Session Initiation Protocol) protocol.

Therefore, the invention relates more particularly to an information network operating under the SIP signalling protocol (Session Initiation Protocol). The SIP protocol is a standardized protocol which makes it possible to establish, modify and terminate multimedia sessions. The SIP protocol is a protocol of the request/response type in the sense where, for each message sent by a source, there is at least one associated response from the recipient confirming reception of the message sent.

A user moreover has the possibility of subscribing to an inter-terminal transfer service, making it possible, during a multimedia session, to carry out operations of transferring or replicating a media stream to other terminals. During the establishment of a multimedia session between a terminal of a user having subscribed to the inter-terminal transfer service and a correspondent, a so-called SCC AS (Service Centralization and Continuity Application Server) server acts as an intermediary between the terminal and the correspondent, so as to then allow the transfer operations, i.e. replacement of the terminal by another terminal, and replication operations, i.e. copying a media stream sent to the terminal towards another terminal. The correspondent can be for example a terminal of another user or an application server. The transfer or replication operation is carried out in a fashion which is not visible to the correspondent, who is therefore not informed of these operations and has no control over them.

However, the owner of the content delivered by an application server through the multimedia session may wish to control to which user terminals this content is delivered, for example to prevent the delivery of the content to multiple terminals, and/or to certain types of terminals, and/or to terminals belonging to different users.

SUMMARY

The present invention aims to improve the situation.

To this end, the invention proposes a method of data processing for limiting, during a multimedia session involving a first user terminal, the operations of transferring or replicating a media stream to other user terminals. The method comprises in particular steps consisting of:

a) receiving a request to transfer or replicate a media stream transmitted by the first user terminal, the request containing information relating to a second user terminal, which is the recipient of the transfer or replication, and information relating to the media stream to be transferred or replicated, b) comparing the information relating to the second user terminal and to the media stream to be transferred or replicated with a set of information elements relating to transfer or replication operations authorised for the multimedia session, and determining, depending on the comparison, whether the transfer or replication operation is authorised, and c) when the transfer or replication operation is authorised, performing the operation of transferring or replicating the media stream to said second user terminal, d) a prior step of establishing a multimedia session between the first user terminal and a correspondent, the prior step comprising an operation of receiving a message, transmitted by the correspondent, containing a set of information elements relating to transfer or replication operations authorised for the multimedia session.

The method thus makes it possible to limit the authorised transfer or replication operations for a media stream, i.e. to exercise control over the broadcasting of multimedia content, even after a multimedia session has been established.

Thus, the owner of an application server can exercise control over the broadcasting of multimedia content delivered by the application server, although the latter does not participate in the steps of the transfer or replication method.

The message can be a SIP message, the set of information elements being inserted into the message via a SIP header. As a variant, the set of information elements can be inserted into the message in the form of an XML document.

The establishment of the session can be initiated by the first user terminal, the set of information elements being inserted into a SIP message of "200 OK" type. As a variant, the establishment of the session can be initiated by the correspondent, the set of information elements being inserted into a SIP message of "INVITE" type.

The set of information elements can comprise an information element for denying the transfer and replication of the media stream to another terminal, and/or an information element for denying the transfer and replication of the media stream to another terminal belonging to another user, and/or an information element for limiting the transfer and replication of the media stream to a terminal of a predetermined type, and/or an information element for limiting the number of terminals to which the media stream can be replicated, and/or an information element for limiting the number of users to whom the media stream can be replicated.

An information element can be associated with a predetermined media stream, the set of information elements being able to contain the information elements respectively associated with several media streams of the multimedia session.

The aforementioned method can be executed by a computer program. The invention therefore also relates to a computer program comprising instructions for implementing the aforementioned method when this program is executed by a processor.

The method can be implemented by a suitable device. The invention therefore also relates to a server configured for limiting, during a multimedia session involving a first user terminal, operations of transferring or replicating a media stream to other user terminals. The server comprises:

a reception module configured for receiving a request for transferring or replicating a media stream transmitted by the first user terminal, the request containing information relating to a second user terminal, which is the recipient of the transfer or replication, and information relating to the media stream to be transferred or replicated, a processing module configured for comparing the information relating to the second user terminal and to the media stream to be transferred or replicated with a set of information elements relating to transfer or replication operations authorised for the multimedia session, and for determining, depending on the comparison, whether the transfer or replication operation is authorised, and a transfer and replication module configured for performing the operation of transferring or replicating the media stream to the second user terminal when the operation has been determined as authorised, the reception module being configured for receiving, during the establishment of a multimedia session between the first user terminal and a correspondent, a message, transmitted by the correspondent, containing a set of information elements relating to transfer or replication operations authorised for the multimedia session, the server comprising a memory module configured for storing the set of information elements.

The invention also relates to a system comprising a server as mentioned previously, and a first user terminal comprising a transmission module configured for transmitting, to the server, a request for transfer or replication of a media stream, the request containing information relating to a second user terminal, which is the recipient of the transfer or replication.

The system can moreover include a second server comprising a transmission module configured for transmitting, during the establishment of a multimedia session between the first user terminal and the second server, a message containing a set of information elements relating to transfer or replication operations authorised for the multimedia session.

Other features and advantages of the invention will become apparent on reading the description which follows. This is purely illustrative and must be read with reference to the attached drawings in which:

DETAILED DESCRIPTION

Figure 1:
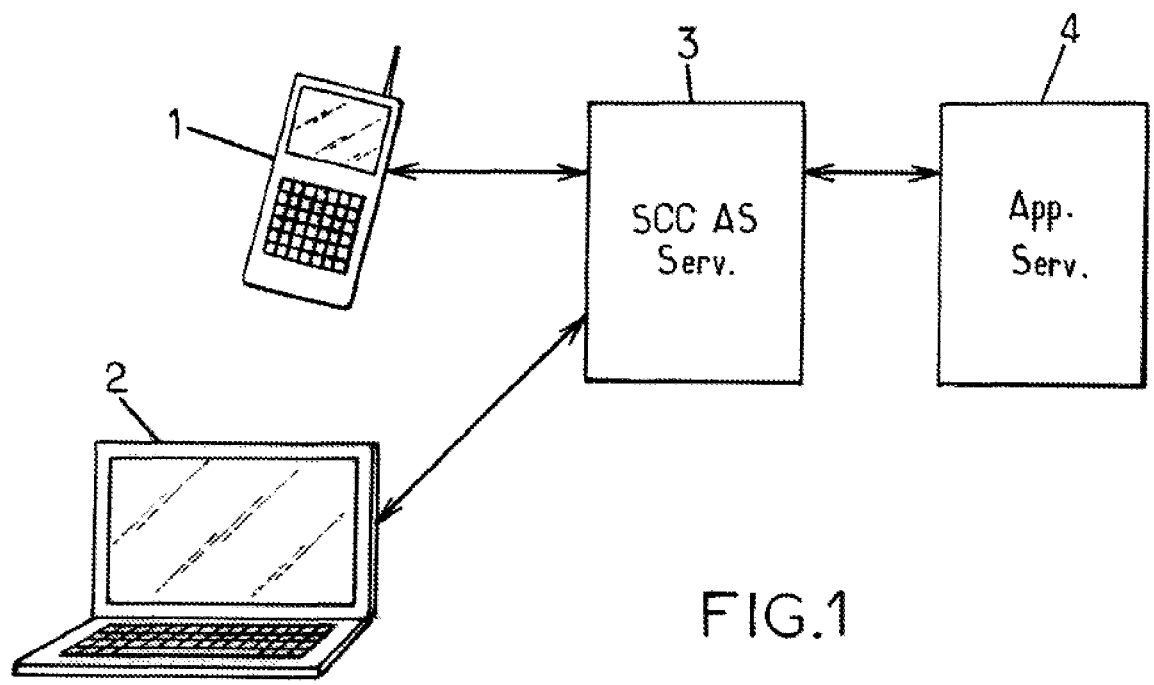
FIG. 1 is a simplified diagrammatic view of an information network according to an embodiment of the invention.

With reference to FIG. 1, an information network is described comprising a network core of IMS (Internet Protocol Multimedia Subsystem) type. The "network core" is the main part of an information network, which concentrates and carries the data stream between feeder networks. The IMS architecture is an open multimedia architecture which uses the SIP (Session Initiation Protocol) protocol. The SIP protocol makes it possible to establish, modify and terminate multimedia sessions. The SIP protocol is a protocol of the request/response type in the sense that, for each message transmitted by a source, there is at least one associated response of the recipient confirming reception of the message sent.

The information network comprises a first user terminal 1, a second user terminal 2, a first application server 3, called SCC AS (Service Centralization and Continuity Application Server) server, and a second application server 4.

The first user terminal 1 can be, for example, a mobile telephone terminal, a portable computer, a digital personal assistant, or other. In the example shown, the first user terminal 1 is a mobile telephony terminal belonging to a user having subscribed to an inter-terminal transfer service.

Figure 2:
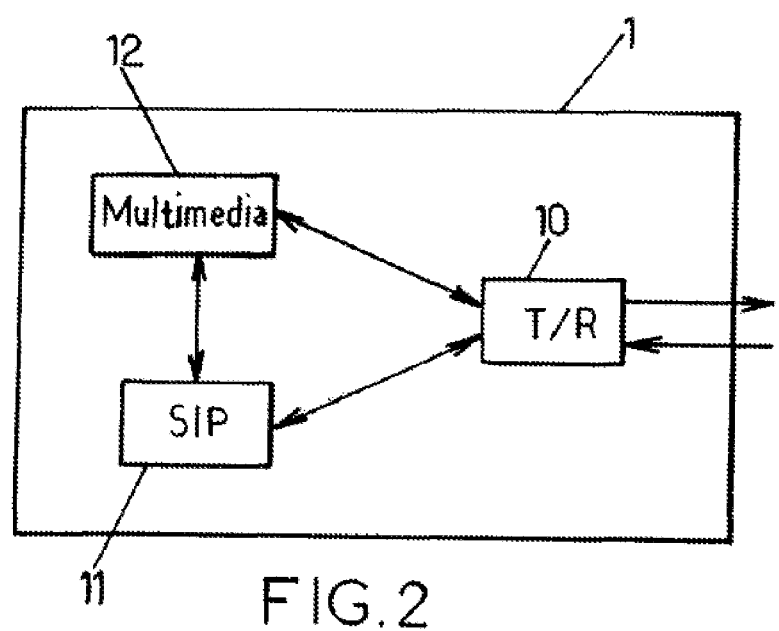
FIG. 2 is a functional diagram showing a first user terminal of the information network of FIG. 1.

As shown in FIG. 2, the first user terminal 1 comprises a transmission-reception module 10 configured for transmitting a request for transferring or replicating, to another terminal, a media stream received by terminal 1. The request comprises information relating to the recipient terminal of the transfer or replication, for example the second user terminal 2. The request also comprises information relating to the media stream to be transferred or replicated. The first user terminal 1 also comprises a SIP module 11 configured for managing the SIP requests, and a multimedia module 12 configured for allowing reading of a media stream, for example of a video.

Similarly, the second user terminal 2 can be a mobile telephony terminal, a portable computer, a digital personal assistant, or other. In the example shown, the second user terminal 2 is a portable computer, which can belong to the same user or to a different user. The second user terminal 2 comprises for example modules similar to the modules of the first user terminal 1.

The function of the SCC AS 3 server is to serve as an intermediary during the establishment of a multimedia session between a terminal of a user having subscribed to the inter-terminal transfer service, for example the first user terminal 1, and a correspondent, for example the second application server 4. The server 3 then in this way allows transfer and replication operations to be performed. An operation of replacing terminal 1 with another terminal for reception of a media stream is called a transfer operation. An operation of copying a media stream sent to terminal 1 to another terminal is called a replication operation.

Figure 3:
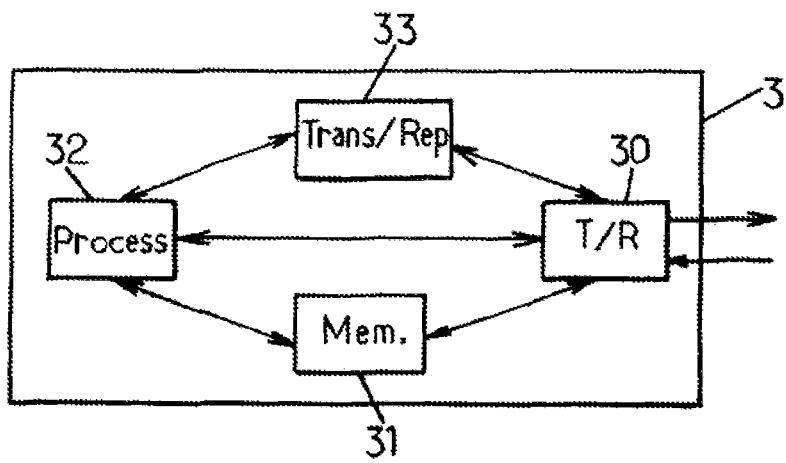
FIG. 3 is a functional diagram showing a first application server of the information network of FIG. 1.

As shown in FIG. 3, the server 3 comprises a transmission-reception module 30 configured for receiving a transfer or replication request transmitted by a terminal of a user having subscribed to the inter-terminal transfer service, for example terminal 1. The transmission-reception module 30 is moreover configured for receiving, during the establishment of a multimedia session, for example between terminal 1 and the application server 4, a message, transmitted by the server 4, containing a set of information elements relating to transfer or replication operations authorised for the multimedia session.

The server 3 comprises a memory module 31 configured for storing the set of information elements received. The server 3 also comprises a processing module 32 configured for comparing information contained in a transfer or replication request, in particular information relating to the recipient terminal of the transfer or the replication, with a set of information elements relating to transfer or replication operations authorised for the multimedia session. The processing module 32 is moreover configured for determining, depending on the comparison, whether the transfer or replication operation is authorised.

The server 3 also comprises a transfer and replication module 33 configured for performing an operation of transferring or replicating a media stream when the operation has been determined as being authorised by the processing module 32.

Figure 4:
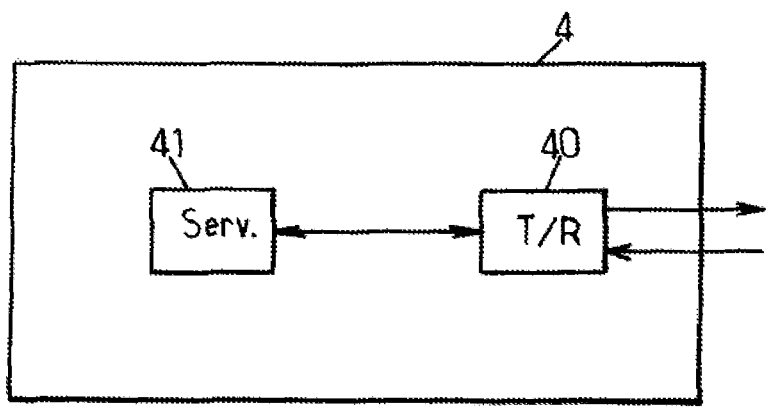
FIG. 4 is a functional diagram showing a second application server of the information network of FIG. 1.

The application server 4 is an example of a correspondent within the meaning of the invention. As shown in FIG. 4, the application server 4 comprises a transmission-reception module 40 configured for transmitting, during the establishment of a multimedia session, for example between the first terminal 1 and the server 4, a message containing a set of information elements relating to transfer or replication operations authorised for the multimedia session.

The application server 4 comprises moreover a service module 41 hosting a service logic, for example a service for providing video and/or music.

Figure 5:
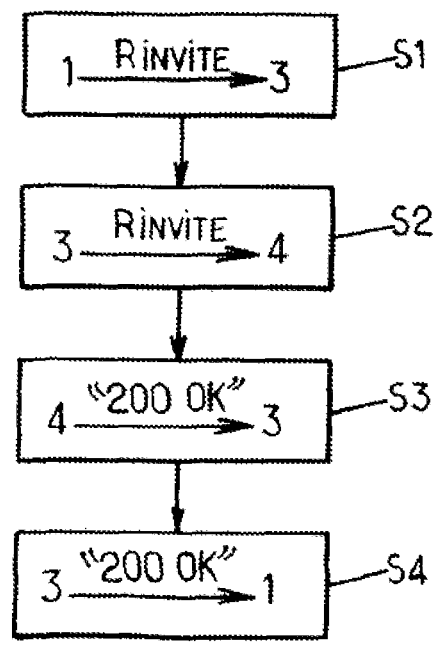
FIG. 5 is a flow chart illustrating the steps of a method for establishing a multimedia session between the first user terminal and a correspondent, which can be the second application server, the establishment of the session being initiated by the first user terminal.

With reference to FIG. 5, a method for establishing a multimedia session between terminal 1 and a correspondent, for example the application server 4, is described below, the establishment of the session being initiated by terminal 1.

In step S1, terminal 1 sends to the server 3 a request for establishing a session, called an INVITE request, requesting the establishment of a multimedia session between terminal 1 and the application server 4. It should be noted that the INVITE request is transmitted to the server 3 as the user of terminal 1 has subscribed to the inter-terminal transfer service.

In step S2, the server 3 receives the INVITE request and generates another INVITE request which is sent to the application server 4.

In step S3, the application server 4 receives the INVITE request. In response to reception of the INVITE request, the application server 4 generates a response message, called "200 OK" message, in order to confirm establishment of the session between the application server 4 and terminal 1.

The response message contains, in addition to the standard elements of a "200 OK" SIP message, a set of information elements intended to indicate the inter-terminal transfer and/or replication operations authorised for this multimedia session. The set of information elements can be inserted into the "200 OK" SIP message via an SIP header dedicated to this purpose, or, as a variant, in the form of an XML (Extensible Markup Language) document included in the "200 OK" SIP message.

The set of information elements has predetermined semantics. For example, the set of information elements can comprise:

- an information element "a=transfer-restriction:same-terminal" for denying the transfer and the replication of the media stream to another terminal, and/or
- an information element "a=transfer-restriction:same-user" for denying the transfer and the replication of the media stream to another terminal belonging to another user, and/or
- an information element "a=transfer-restriction:tv" for limiting the transfer and the replication of the media stream to a television-type terminal, similar information elements being able to be used for limiting the transfer and the replication of the media stream to terminals of a certain type, for example mobile telephone, computer, or other, and/or
- an information element "a=replication-limit: terminals=n" for limiting the number of terminals to which the media stream can be replicated, the integer n corresponding to the maximum number of replications, and/or
- an information element "a=replication-limit: users=n" for limiting the number of users to which the media stream can be replicated, the integer n corresponding to the maximum number of users.

The semantics also makes it possible to specify to what type(s) of media each of the authorised or denied operations apply, i.e. to specify, for each information element, whether it applies to an audio and/or video and/or text stream for example. It is thus possible, in particular, to deny the transfer and the replication to another terminal in the case of the video stream, and, to deny the transfer and the replication to another user and to limit the replication to two terminals, in the case of the audio stream. In this example, the server 4 inserts into the part of the SIP message relating to the video stream an information element "a=transfer-restriction:same-terminal", and into the part of the SIP message relating to the audio stream an information element "a=transfer-restriction: same-user" and an information element "a=replication-limit: terminals=2".

When the response message has been generated, the server 4 transmits the response message to the server 3.

In step S4, the server 3 receives the response message, decodes it and stores the set of information elements inserted into the response message in a database in the memory module 31.

Then, the server 3 generates a response message to terminal 1. The multimedia session is then established. The user can then, via the multimedia module 12, display a media stream, for example a video or an audio recording, delivered by the application server 4.

Figure 6:
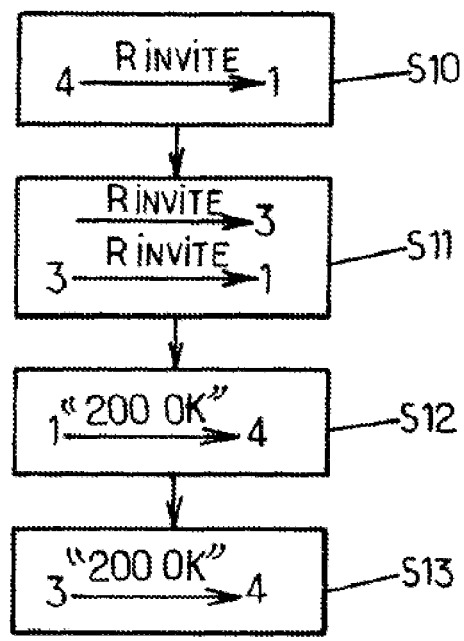
FIG. 6 is a flow chart illustrating the steps of a method for establishing a multimedia session between the first user terminal and a correspondent, the establishment of the session being initiated by the correspondent.

With reference to FIG. 6, a method for establishing a multimedia session between terminal 1 and a correspondent is described below, for example the application server 4, the establishment of the session being initiated by the correspondent.

In step S10, the application server 4 sends a request to establish a session, called INVITE request, to terminal 1.

The INVITE request contains, in addition to the standard elements of an SIP INVITE request, a set of information elements intended to indicate the inter-terminal transfer and/or replication operations authorised for this multimedia session.

The set of information elements is constructed in a similar manner to that which was described for step S3. Moreover, as described for this step, the set of information elements can be inserted into the SIP INVITE request via a SIP header dedicated to this purpose, or, as a variant, in the form of an XML (Extensible Markup Language) document included in the SIP INVITE request.

In step S11, the server 3 intercepts the INVITE request intended for terminal 1, as the user of terminal 1 has subscribed to the inter-terminal transfer service. The server 3 decodes the request and stores the set of information elements inserted into the request in the database in the memory module 31. Then, the server 3 generates an INVITE request to terminal 1.

Thus, the application server 4 does not need to know whether terminal 1 benefits from the inter-terminal transfer service. Indeed, if that is the case, the set of information elements will be received and taken into account by the server 3, if not it will quite simply be ignored.

In step S12, terminal 1 receives the INVITE request. In response to reception of the INVITE request, terminal 1 generates a response message, called a "200 OK" message, in order to confirm the establishment of the session between the application server 4 and terminal 1. Then, terminal 1 transmits the response message to the server 3.

In step S13, the server 3 receives the response message and generates a response message to the server 4. The multimedia session is then established. The user can then, via the multimedia module 12, display a media stream, for example a video or an audio recording, stored on the application server 4.

Figure 7:
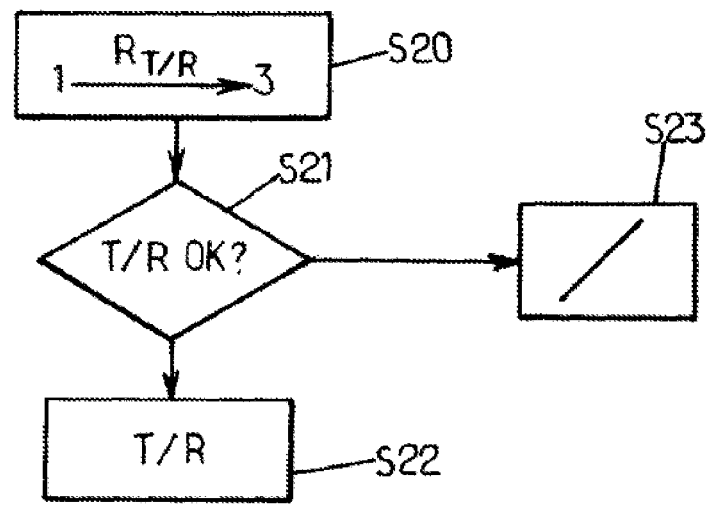
FIG. 7 is a flow chart illustrating the steps of a method for transferring or replicating a media stream transmitted by the correspondent to the first user terminal, this flow chart being able to represent the general algorithm of the computer program within the meaning of the invention.

With reference to FIG. 7, a method for transferring or replicating a media stream transmitted by the correspondent, in the example the application server 4, to the first user terminal 1 is described below. In other words, it is assumed that a multimedia session has been established beforehand between the first user terminal 1 and the application server 4, and that the user of the first terminal 1 wishes to carry out an operation of transferring or replicating a media stream to another terminal, for example terminal 2.

In step S20, the first user terminal 1 transmits a transfer or replication request to the server 3. The request contains in particular information relating to the recipient terminal of the transfer or the replication, in the example the second user terminal 2. The request also contains information relating to the media stream to be transferred or replicated.

In step S21, the server 3 receives the request, decodes it and compares the information relating to the recipient terminal 2 and to the media stream to be transferred or replicated with the set of information elements stored during the establishment of the session, i.e. in step S4 or in step S11.

Then, the server 3 determines, depending on the comparison, whether the transfer or replication operation must be authorised or denied. When the transfer or replication operation must be authorised, the method passes to step S22. When the transfer or replication operation must be denied, the method passes to step S23.

In step S22, the server 3 performs the operation of transferring or replicating the media stream to the second user terminal 2.

In step S23, the server 3 rejects the request and does not perform the transfer or replication operation.

This method thus makes it possible to prevent an operation for transferring or replicating a media stream when it is contrary to instructions originating from the application server 4, although the latter does not participate in the steps of the transfer or replication method. In other words it allows an owner of an application server to exercise control over the broadcasting of multimedia content delivered by the application server.

It is assumed for example that a first user and a second user are watching a video on the mobile telephone of the first user, and that the second user wishes to watch the end of the video on another terminal, for example a television.

In step S20, a transfer or replication request is transmitted by the mobile telephone requesting the transfer or the replication of the video on the television.

In step S21, the SCC server receives the request and compares it to a set of information elements received from the application server containing the video during the establishment of the multimedia session. Thus, if the provider of the video refuses to allow this video to be displayed on a terminal other than a mobile telephone, the SCC server will reject the request and will not perform the transfer or replication operation requested. Indeed, the network operator, the owner of the SCC server, must allow the operation only if the provider of the video authorises it to be displayed on a terminal other than the mobile, otherwise the network operator could be infringing the broadcasting agreement that it has with the content provider. This authorisation can depend on the type of video and subscription that the user has with the provider.

Of course, the present invention is not limited to the embodiments described above by way of examples; it extends to other variants.

The invention claimed is:

1. A method of data processing for limiting, during a multimedia session between a first user terminal and a correspondent, through an intermediate server, operations of replacing the first terminal by another user terminal in the reception of a media stream of the multimedia session, namely transfer, or copying a media stream sent to the first terminal towards another user terminal, namely replication, the method comprising the steps:

a) establishing of a multimedia session between said first user terminal and the correspondent through said intermediate server using SIP, wherein the correspondent is a content provider, said establishing comprising an operation of reception of a SIP message, transmitted by said correspondent to the intermediate server, containing a set of information elements relating to transfer or replication operations authorised for a media stream of said multimedia session, wherein if the establishment of the session is initiated by said first user terminal, the set of information elements are inserted into the SIP message, the SIP message being a SIP response message to establish the session, and if the establishment of the session is initiated by said correspondent, the set of information elements being inserted into the SIP message, the SIP message being a SIP request message to establish the session, b) receiving a request to transfer or replicate the media stream of said multimedia session, said request being transmitted by the first user terminal to the intermediate server, said request containing information relating to a second user terminal, which is a recipient of the transfer or the replication, and information relating to the media stream to be transferred or replicated, c) comparing said information relating to the second user terminal and to the media stream to be transferred or replicated with a set of information elements relating to transfer or replication operations authorised for the media stream of said multimedia session, said comparison being performed by the intermediate server, and determining, depending on the comparison, whether the transfer or replication operation is authorised, and d) when the transfer or duplication operation is authorised, performing the operation of transferring or replicating the media stream from the first user terminal to said second user terminal, said operation of transferring or replicating being performed by the intermediate server, wherein said set of information elements comprises an information element for denying the transfer and the replication of the media stream to another terminal, or an information element for denying the transfer and the replication of the media stream to another terminal belonging to another user, or an information element for limiting the transfer and the replication of the media stream to a terminal of a predetermined type, or an information element for limiting the number of terminals to which the media stream can be replicated, or an information element for limiting the number of users to which the media stream can be replicated.

2. The method according to claim 1, the set of information elements being inserted into said SIP message via a SIP header.

3. The method according to claim 1, the set of information elements being inserted into said SIP message in the form of an XML document.

4. The method according to claim 1, wherein an information element is associated with a predetermined media stream, wherein the set of information elements can contain the information elements respectively associated with several media streams of the multimedia session.

5. A non-transitory computer readable storage medium for limiting, during a multimedia session between a first user terminal and a correspondent through an intermediate server, operations of replacing the first terminal by another user terminal in the reception of a media stream of the multimedia session, namely transfer, or copying a media stream sent to the first terminal towards another user terminal, namely replication, operations of transferring or replicating a media stream to other user terminals, having stored thereon a computer program comprising program instructions, the computer program being loadable into a data-processing unit and adapted to cause the data-processing unit to carry out, when the computer program is run by the data-processing unit:

a) establishing of a multimedia session between said first user terminal and the correspondent through said intermediate server using SIP, wherein the correspondent is a content provider, said establishing comprising an operation of reception of a SIP message, transmitted by said correspondent to the intermediate server, containing a set of information elements relating to transfer or replication operations authorised for a media stream of said multimedia session, wherein if the establishment of the session is initiated by said first user terminal, the set of information elements are inserted into the SIP message, the SIP message being a SIP response message to establish the session, and if the establishment of the session is initiated by said correspondent, the set of information elements being inserted into the SIP message, the SIP message being a SIP request message to establish the session, b) receiving a request to transfer or replicate the media stream of said multimedia session, said request being transmitted by the first user terminal to the intermediate server, said request containing information relating to a second user terminal, which is a recipient of the transfer or the replication, and information relating to the media stream to be transferred or replicated, c) comparing said information relating to the second user terminal and to the media stream to be transferred or replicated with a set of information elements relating to transfer or replication operations authorised for the media stream of said multimedia session, said comparison being performed by the intermediate server, and determining, depending on the comparison, whether the transfer or replication operation is authorised, and d) when the transfer or duplication operation is authorised, performing the operation of transferring or replicating the media stream from the first user terminal to said second user terminal, said operation of transferring or replicating being performed by the intermediate server, wherein said set of information elements comprises an information element for denying the transfer and the replication of the media stream to another terminal, or an information element for denying the transfer and the replication of the media stream to another terminal belonging to another user, or an information element for limiting the transfer and the replication of the media stream to a terminal of a predetermined type, or an information element for limiting the number of terminals to which the media stream can be replicated, or an information element for limiting the number of users to which the media stream can be replicated.

6. A server configured for limiting, during a multimedia session between a first user terminal and a correspondent through said server, operations of replacing the first terminal by another user terminal in the reception of a media stream of the multimedia session, namely transfer, or copying a media stream sent to the first terminal towards another user terminal, namely replication, the server comprising:

a reception module being configured for receiving, during establishment of the multimedia session between the first user terminal and the correspondent using SIP, wherein the correspondent is a content provider, a SIP message, transmitted by the correspondent to said server, containing a set of information elements relating to transfer or replication operations authorised for the media stream of the multimedia session, wherein if the establishment of the session is initiated by said first user terminal, the set of information elements are inserted into the SIP message, the SIP message being a SIP response message to establish the session, and if the establishment of the session is initiated by said correspondent, the set of information elements being inserted into the SIP message, the SIP message being a SIP request message to establish the session, the reception module configured for receiving a request for transfer or replication of the media stream of said multimedia session, said request being transmitted by the first user terminal, said request containing information relating to a second user terminal, which is a recipient of the transfer or the replication, and information relating to the media stream of said multimedia session to be transferred or replicated, a processing module configured for comparing said information relating to the second user terminal and to the media stream of said multimedia session to be transferred or replicated with the set of information elements relating to transfer or replication operations authorised for the media stream of said multimedia session, and for determining, depending on the comparison, whether the transfer or replication operation is authorised, a transfer and replication module configured for performing the operation of transferring or replicating of the media stream of said multimedia session to said second user terminal when said operation has been determined as authorised, and a memory module configured for storing the set of information elements, wherein said set of information elements comprises an information element for denying the transfer and the replication of the media stream to another terminal, or an information element for denying the transfer and the replication of the media stream to another terminal belonging to another user, or an information element for limiting the transfer and the replication of the media stream to a terminal of a predetermined type, or an information element for limiting the number of terminals to which the media stream can be replicated, or an information element for limiting the number of users to which the media stream can be replicated.

7. The server according to claim 6, wherein said reception module is configured for receiving, during the establishment of the multimedia session between said first user terminal and a correspondent, a SIP message, transmitted by said correspondent, containing a set of information elements relating to transfer or replication operations authorised for the media stream of said multimedia session, said server comprising a memory module configured for storing said set of information elements.

8. A system comprising the server according to claim 6, and a first user terminal comprising a transmission module configured for transmitting, to said server, a request for transfer or replication of the media stream of the multimedia session, said request containing information relating to a second user terminal, which is the recipient of the transfer or the replication.

9. The system according to claim 8, further comprising a second server comprising a transmission module configured for transmitting, during the establishment of the multimedia session between said first user terminal and said second server, a message containing a set of information elements relating to transfer or replication operations authorised for the media stream of said multimedia session.

\* \* \* \* \*